United States Patent
Itou

(10) Patent No.: US 8,385,746 B2
(45) Date of Patent: Feb. 26, 2013

(54) OPTICAL INTERFACE DEVICE, AND ABNORMALITY MONITORING METHOD FOR INPUT FREQUENCY DEVIATION

(75) Inventor: Sunao Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 13/031,608

(22) Filed: Feb. 21, 2011

(65) Prior Publication Data

US 2011/0236031 A1   Sep. 29, 2011

(30) Foreign Application Priority Data

Mar. 29, 2010   (JP) ................................. 2010-074395

(51) Int. Cl.
  *H04B 10/00*   (2006.01)
  *H04B 10/08*   (2006.01)
  *H04B 17/00*   (2006.01)

(52) U.S. Cl. ........................................... 398/140; 398/9
(58) Field of Classification Search ........................ None
  See application file for complete search history.

(56) References Cited

U.S. PATENT DOCUMENTS

| 4,393,493 A | * | 7/1983 | Edwards ........................ 370/228 |
| 4,696,001 A | * | 9/1987 | Gagliardi et al. ............... 398/60 |
| 2009/0162061 A1 | | 6/2009 | Kisaka et al. |

FOREIGN PATENT DOCUMENTS

| EP | 0936760 | 8/1999 |
| JP | 11-298410 A | 10/1999 |
| JP | 2002-353912 A | 12/2002 |
| WO | WO 2007/072921 | 6/2007 |

* cited by examiner

*Primary Examiner* — Kenneth N Vanderpuye
*Assistant Examiner* — Casey Kretzer
(74) *Attorney, Agent, or Firm* — Fujitsu Patent Center

(57) ABSTRACT

An optical interface device determines whether frequency deviation of a clock signal corresponding to an optical signal from a client side is abnormal based on a stuff amount when subjecting a data signal corresponding to an optical signal input from the client side to a stuffing process, inserts an alarm indication signal (AIS) indicating that the frequency deviation is abnormal into a predetermined region of a data signal when the deviation is determined to be abnormal, and outputs an optical signal generated corresponding to the data signal to a WDM line side so as to transfer the AIS to another component disposed downstream therefrom, so that locating a site where an abnormal state occurs is made easier.

12 Claims, 8 Drawing Sheets

FIG. 8

SYNCHRONOUS MAPPING FRAME STURCTURES
(WHEN CONVERTING FOUR ONE CHANNEL OF 9.95328 Gb/s OR 10.312496 Gb/s (10 GBE) TO OUT2)

|   | 1 | | 14 15 16 17 | 3824 |
|---|---|---|---|---|
| 1 | Aliment | OTU2 OH | OPU2 OH | Client Layer Signal |
| 2 | | | | (9.953280 Gb/s OR 10.312496 Gb/s IS CONTAINED) |
| 3 | ODU2 OH | | | |
| 4 | | | | |

ODU2

9.953280[Gb/s]×239/237
=10.037273[Gb/s]
10.312496[Gb/s]×239/237
=10.399521[Gb/s]

|   | 1 | | 14 15 16 17 | 3824 3825 | 4080 |
|---|---|---|---|---|---|
| 1 | Aliment | OTU2 OH | OPU2 OH | Client Layer Signal | OTU2 FEC |
| 2 | | | | | |
| 3 | ODU2 OH | | | | |
| 4 | | | | | |

OTU2

9.953280[Gb/s]×255/237
=10.709225[Gb/s]
10.312496[Gb/s]×255/237
=11.095724[Gb/s]

OPTICAL INTERFACE DEVICE, AND ABNORMALITY MONITORING METHOD FOR INPUT FREQUENCY DEVIATION

CROSS-REFERENCE TO RELATED APPLICATION

This application is based upon and claims the benefit of priority of the prior Japanese Patent Application No. 2010-074395, filed on Mar. 29, 2010, the entire contents of which are incorporated herein by reference.

FIELD

The embodiments discussed herein are related to optical interface devices for converting a first optical signal that is received from a first optical transmission line to a second optical signal that can be transmitted through a second optical transmission line which is different from the first optical transmission line.

BACKGROUND

FIG. 1 is a diagram illustrating an exemplary configuration of a typical wavelength division multiplexing (WDM) optical transmission system. In this WDM optical transmission system, a WDM signal light, composed of multiplexed optical signals each having a different wavelength, is bidirectionally transmitted between opposite WDM optical transmission devices 1 through optical transmission lines (WDM lines) 2. Each WDM optical transmission device 1 is further connected to two or more client devices 3 via optical transmission lines (client lines) 4. The WDM optical transmission device 1 includes, for example, as illustrated in FIG. 2, an optical interface device 10 and an optical wavelength multiplexing-demultiplexing device 30, and performs inter-conversion between optical signals respectively carried on channels CH1 to CHn through the client lines 4 and a WDM signal light that is transmitted through the WDM line 2.

The optical interface device 10 has a plurality of optical units 10A, 10B, etc. For example, the optical interface 10A converts optical signals carried on four channels, which are received from the client lines 4, to an optical signal suitable for transmission on the WDM line 2, and performs reverse conversion thereof. Furthermore, the optical interface 10B converts an optical signal carried on one channel, which is received from the client line 4, to an optical signal suitable for transmission on the WDM line 2, and performs reverse conversion thereof.

Specifically, in optical signal conversion by the optical interface 10A, optical signals, which are carried on four channels CH1 to CH4 through the client lines 4, are respectively received by optical transceivers 11 which are compliant with MSA (Multi Source Agreement) specification, and each optical transceiver 11 generates appropriate client signals (a data signal and a clock signal) for each optical signal. Each client signal generated by each optical transceiver 11 is converted so as to have a frame format for an OTU (optical channel transport unit) by a digital wrapper 13 that is defined by the ITU-T G.709 (Interfaces for the optical transport network, OTN). Then, a data string, that was contained into an OTU frame by the digital wrapper 13, is supplied to an MSA-compliant optical transceiver 15, and the MSA-compliant optical transceiver 15 modulates a light within the WDM wavelength band according to the data string and outputs the resultant optical signal to the optical wavelength multiplexing-demultiplexing device 30. In the optical wavelength multiplexing-demultiplexing device 30, optical signals of different wavelengths from the optical interfaces 10A, 10B, and so on, are multiplexed by a multiplexer 31, and the resultant WDM signal light is amplified to a desired level and is supplied to the WDM line 2 by a post-amplifier 33.

In the process performed by the digital wrapper 13 above, if a clock signal corresponding to an optical signal received from the client line 4 is asynchronous with a clock signal corresponding to an optical signal to be transmitted to a WDM line 2 side, the client signal is framed by synchronizing this client signal with a standard clock signal that is generated by a fixed oscillator, etc., within the optical interface. At this time, a stuffing process is performed to compensate for a difference between a bit rate (clock frequency) of the client signal and a standard clock frequency. In the stuffing process, an NJO (negative justification opportunity) byte and a PJO (positive justification opportunity) byte, both defined for an overhead of an OPU (optical channel payload unit) within the OTU frame, are used. According to the difference between a clock frequency of a client signal and a standard clock reference, either positive stuffing for inserting a justification byte (zero) or negative stuffing for accommodating extra data of a client signal is performed. Furthermore, when a stuffed signal is processed by the digital wrapper 13 on receiving side, a client signal that is similar to that on the transmitting side is recovered by performing a destuffing process based on the aforementioned OPU overhead information.

In the WDM optical transmission device 1 as described above, a client-side optical signal supplied to the optical interface device 10 has a clock frequency which includes a deviation within ±20 ppm according to ITU-T Recommendations. Furthermore, an optical signal available for Ethernet (registered trademark) may also be input to the optical interface device 10. For example, an optical signal available for 10 Gbit/s Ethernet (hereinafter abbreviated as "10 GbE") has a clock frequency which includes a deviation within ±100 ppm according to IEEE 802.3ae.

A prior art technique for accommodating such a frequency deviation of a client-side optical signal is, for example, disclosed in International Publication Pamphlet No. WO 2007/072921 which proposes, regarding a stuffing process, to enable synchronization with a client-side optical signal within a large frequency range by adding a new overhead to each client signal, and using two or more defined stuffing bytes in cooperation with the new overheads.

However, even if such a conventional stuffing technique described above is applied to an optical interface device, when a deviation of a clock frequency of a client optical signal that is actually supplied to the optical interface device is outside of the defined range above due to occurrence of trouble in a system, a client device which receives the optical signal at a terminal of the line may detects an error. In this case, a conventional WDM optical transmission system suffers from the problem that locating a position in which an abnormal frequency condition occurs is difficult.

For example, in the forgoing exemplary configuration illustrated in FIG. 1, suppose that a deviation not within ±100 ppm occurs in a clock frequency of a 10-GbE optical signal to be transmitted to the WDM optical transmission device 1 from an optical transmitter (TX) of the client device 3 through the client line 4. In this case, when each optical module provided in each of the WDM optical transmission devices 1 which are respectively disposed at the opposite ends of the WDM line 2 has a proof strength with respect to the aforementioned deviation of the clock frequency whereas an optical receiver (RX) in the client device 3 disposed at a terminal end of the client line 4 on receiving side has no proof strength with respect thereto, the receiving client device 3 detects an error, an error detected by a client device 3 on receiving side. At this time, however, since each WDM optical transmission device 1 successfully completes its process, the matter that some error occurs in the clock frequency of a client-side optical signal to be supplied to the transmitting WDM optical transmission device 1 cannot be determined. Furthermore, since about ±160 ppm margin is provided for a stuff amount that is processed by an optical interface within each WDM optical transmission device 1 due to application of the conventional technique described above, no error resulting from a stuffing process limit occurs.

In addition, in the conventional WDM optical transmission device 1, the optical interface 10B (FIG. 2) for converting a 1-channel optical signal received from the client line 4 may use a clock signal, which was used for conversion of a client-side optical signal, as a reference clock signal when recovering a data signal and a clock signal by use of a received light (an optical signal received from the WDM line 2) on the opposite line side within the same optical interface. In this case, when a deviation of a clock frequency of a client-side optical signal increases, a frequency deviation of a reference clock signal in an optical reception process on the aforementioned opposite line exceeds the proof strength. This poses a problem because it may cause error occurrence on the opposite line, as well as the above-described error detection problem at the line terminal end.

SUMMARY

One aspect of the invention provides an optical interface device for converting a first optical signal that is received from a first optical transmission line to a second optical transmission signal that can be transmitted through a second optical transmission line which is different from the first optical transmission line. The optical interface device comprises: an optical receiver configured to receive the first optical signal, and configured to recover a first data signal and a first clock signal corresponding to the first optical signal; a clock generator configured to generate a second clock signal corresponding to the second optical signal; a frequency difference detector configured to detect a frequency difference between the first clock signal and the second clock signal, and configured to generate information regarding a stuff amount for a stuffing process to be applied to the first data signal for compensating for the difference; a stuffing circuit configured to subject the first data signal to a stuffing process based on the information generated by the frequency difference detector according to timing of the second clock signal; a determination circuit configured to determine whether a frequency deviation of the first clock signal is abnormal based on the information generated by the frequency difference detector; an alarm generator configured to receive a data signal from the stuffing circuit, and configured to generate an alarm indication signal indicating that the frequency deviation is abnormal to another component that is disposed downstream therefrom through the second optical transmission line when the determination circuit determines abnormal frequency deviation, to thereby insert the alarm indication signal in a predetermined region of the data signal; a converter configured to convert the data signal passed through the alarm generator to a second data signal having a frame structure that is compatible with the second optical signal; and an optical transmitter configured to modulate light according to the second data signal, to thereby generate the second optical signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a frame structure when a 1-channel 9.95328 Gb/s or 10 GbE client-side signal is converted to an OTU2.

DESCRIPTION OF EMBODIMENTS

Hereinafter, embodiments of the invention will be described in detail with reference to the accompanying drawings.

Figure 1:
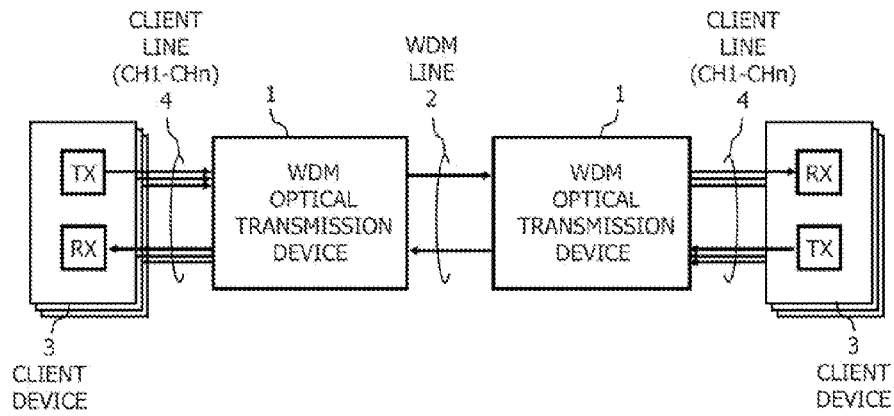
FIG. 1 illustrates an exemplary configuration of a WDM optical transmission system.
Figure 2:
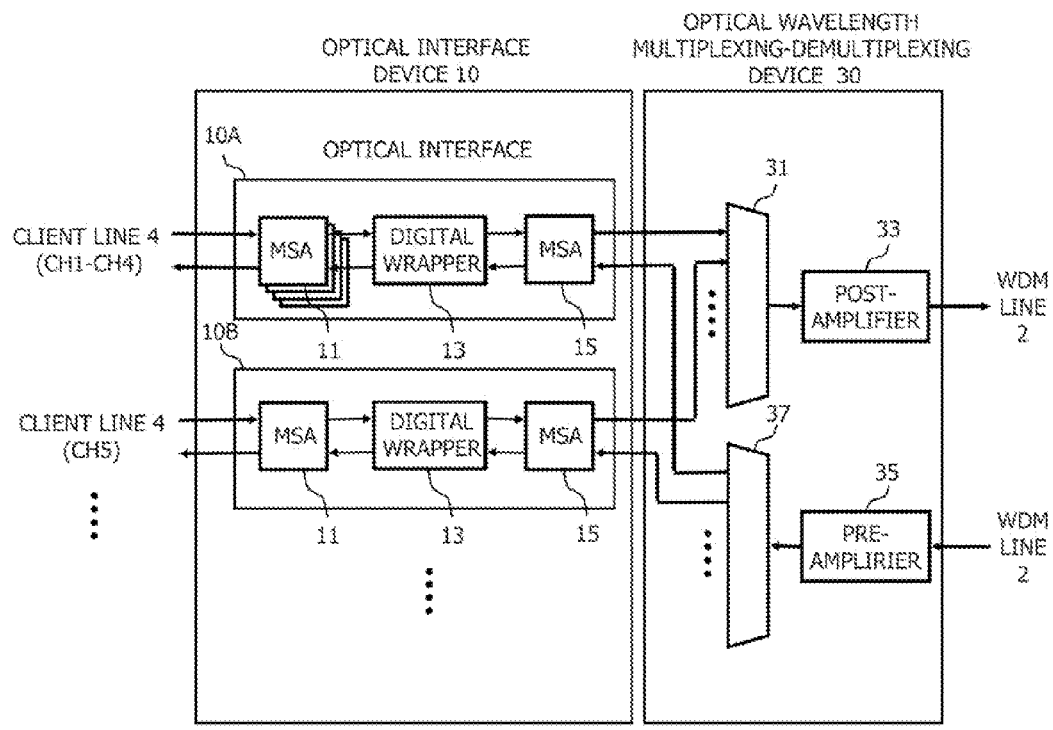
FIG. 2 illustrates an exemplary configuration of a WDM optical transmission device in FIG. 1.
Figure 3:
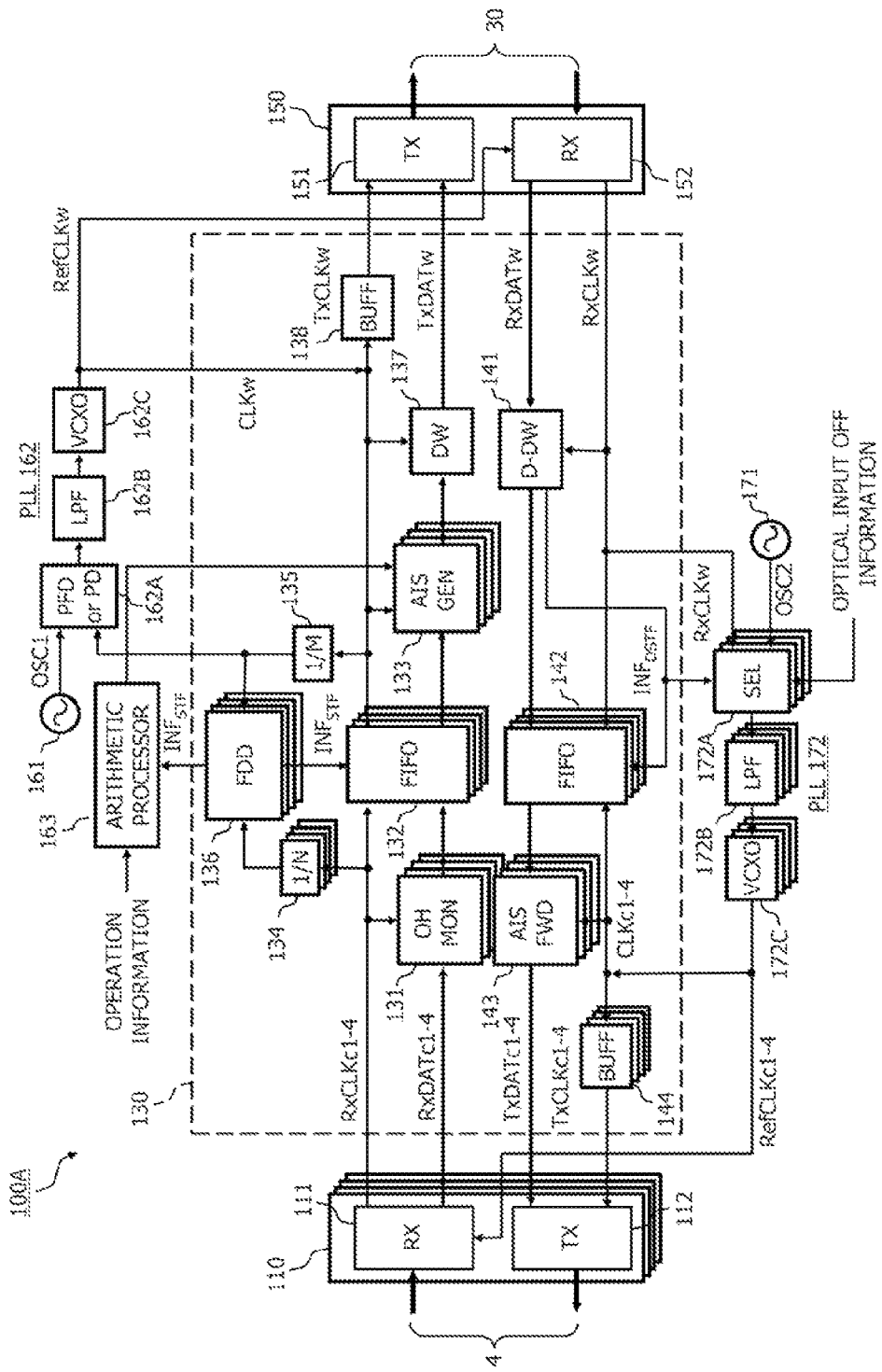
FIG. 3 is a block diagram illustrating a configuration of an optical interface according to a first embodiment.

FIG. 3 is a block diagram illustrating a configuration of an optical interface according to a first embodiment. This optical interface, indicated by reference numeral 100A, is equivalent to the optical interface 10A within the optical interface device 10 that is a component of the WDM optical transmission device 1 illustrated in FIG. 2 described above. The aforementioned optical interface 100A converts a 4-channel optical signal received from the client line 4, to an optical signal suitable for transmission on the WDM line 2, and performs reverse conversion thereof. A WDM optical transmission system, which uses a WDM optical transmission device 1 including the optical interface 100A, may have a system configuration similar to that illustrated in FIG. 1 described above.

Specifically, in FIG. 3, the optical interface 100A comprises, for example, an MSA (multi-source agreement) compliant optical transceiver 110 connected to client lines 4, an MSA-compliant optical transceiver 150 connected to the optical wavelength multiplexing-demultiplexing device 30 (in FIG. 2) which is a component of the WDM optical transmission device 1, and a digital wrapper 130 for processing electric signals which are input to or output from each of the aforementioned optical transceivers 110 and 150.

The optical transceiver 110 has a pair of an optical receiver (RX) 111 and an optical transmitter (TX) 112, and each pair is associated with each of four client-side channels CH1 to CH4. Each optical receiver 111 receives an optical signal (first optical signal) on each channel, supplied from each client line 4 (first optical transmission line), converts the received optical signal to an electric signal, and recovers the data and clock therein. The data and clocks, recovered at the respective optical receivers 111, are supplied to the digital wrapper 130 as client side received data signals RxDATc1 to RxDATc4 (first data signals) and as client side received clock signals RxCLKc1 to RxCLKc4 (first clock signals). Each optical transmitter 112 generates an optical signal (fourth optical signals) corresponding to each channel CH1 to CH4 according to the signals which are output from the digital wrapper 13 as follows: a client-side transmitting data signal TxDATc1 to TxDATc4 and a client-side transmitting clock signal TxCLKc1 to TxCLKc4 (described later).

The digital wrapper 130 includes OH monitoring circuits (OH MON) 131, each of which monitors overhead information of the client-side received signal RxDATc1 to RxDATc4 according to timing of a client-side received clock signal RxCLKc1 to RxCLKc4 supplied from the receiver 111 of the corresponding optical transceiver 110. The client-side received data signal RxDATc1 to RxDATc4 passed through each OH monitoring circuit 131 is transmitted to each FIFO 132 within the digital wrapper 130.

Each FIFO 132 writes the client-side received data signal RxDATc1 to RxDATc4 passed through each OH monitoring circuit 131 according to timing of each client-side received clock signal RxCLKc1 to RxCLKc4. Furthermore, each FIFO 132 also reads a contained client-side received data signal according to timing of an output clock signal CLKw (second clock signal) from a phase lock loop (PLL). The output clock signal CLKw is synchronous with a standard clock signal OSC1 that is generated by a fixed oscillator 161 provided in the optical interface 100A. Then, the FIFO 132 outputs the read client-side data signal to each AIS generating circuit (AIS GEN) 133 that is located on the WDM side. The PLL 162 feedbacks an output clock signal CLKw to a phase frequency detector (phase detector: PD) (PFD) 162A, detects a phase error with respect to a standard clock signal OSC1 by the phase frequency detector 162A, and supplies a resultant phase error signal to an oscillator (VCXO) 162C via a low pass filter (LPF).

When each FIFO 132 writes and reads a client-side received data signal, a stuffing process is performed for compensating for a difference between a frequency fc1 to fc4 of each client-side received clock signal RxCLKc1 to RxCLKc4 and a frequency Fs of a standard clock signal OSC1 generated by the fixed oscillator 161, and performing synchronization therebetween. Specifically, each client-side received clock signal RxCLKc1 to RxCLKc4 and a part of an output clock signal CLKw from the PLL 162, which are supplied to each FIFO 132, are provided to a frequency difference detection circuit (FDD) 136 respectively via a 1/N frequency demultiplxing circuit 134 and a 1/M frequency demultiplxing circuit 135, and a difference between each clock frequency fc1 to fc4 and a clock frequency fs is detected by the frequency difference detection circuit 136. Then, the frequency difference detection circuit 136 generates information regarding a stuff amount $INF_{STF}$ (hereinafter referred to as "stuff information $INF_{STF}$") according to the detected clock frequency difference, and transfers the stuff information $INF_{STF}$ to the FIFO 132.

For example, when a frequency fc1 of a client-side received clock signal RxCLKc1 is lower than a frequency fs of an output clock signal CLKw from the PLL 162 (fc1<fs), the data amount of a client-side received data signal RxDATc1 is small. Thus, the aforementioned stuff information $INF_{STF}$ indicates an insufficient data amount according to the clock frequency difference. On the other hand, when a frequency fc1 of a client-side received clock signal RxCLKc1 is higher than a frequency fs of an output clock signal CLKw from the PLL 162 (fc1>fs), the data amount of a client-side received data signal RxDATc1 is large. Thus, the stuff information $INF_{STF}$ indicates an extra data amount according to the clock frequency difference.

If the stuff information $INF_{STF}$ indicates data shortage, the FIFO 132, which receives the stuff information $INF_{STF}$ from the frequency difference detection circuit 136, performs a positive stuffing process for inserting a stuff bit corresponding to the insufficient data amount into a predetermined region of the client-side received data signal. On the other hand, if the stuff information $INF_{STF}$ indicates data excess, the FIFO 132 performs a negative stuffing process for containing the extra data of the client-side received data signal into a predetermined region within an overhead area. Information regarding the stuffing process performed by the FIFO 132 is recorded in the overhead area as the information for performing a destuffing process at the receiving side. Thus, the FIFO 132 has a function as a stuffing circuit.

According to an output signal from an arithmetic processor 163 provided in the optical interface 100A, each AIS generating circuit 133 generates an alarm indication signal (AIS) for indicating abnormality of a clock frequency of a client-side optical signal to another component that is disposed downstream therefrom and connected thereto via a WDM line 2. The AIS is inserted into a predetermined region within an overhead are of an output data signal from a corresponding FIFO 132 according to timing of an output clock signal CLKw from the PLL 162. A data signal passed through each AIS generating circuit 133 is input to a conversion circuit (DW) 137.

Together with the stuff information $INF_{STF}$ that is generated by the frequency difference detection circuit 136, information regarding operating conditions (hereinafter referred to as "operation information") of an optical signal carried on each channel WDM in the optical transmission system which uses the WDM optical transmission device 1 including the optical interface 100A is transferred to the arithmetic processor 163 by a system management unit (not illustrated). After identification of a type (applicable specification, bit rate, etc.) of an optical signal carried on each channel CH1 to CH 4 which is input from each client line 4 to the optical interface 100A based on the operation information, the arithmetic processor 163 determines that the frequency of a client-side received clock signal corresponding to the channel is abnormal and outputs a signal indicating the result to the AIS generating circuit 133, when the stuff information $INF_{STF}$ corresponding to each channel indicates a value that exceeds a stuff amount which can occur within the specification limits of frequency deviation. Specifically, the above-described determination of abnormality of frequency by use of the stuff information $INF_{STF}$ may be performed by presetting a threshold value of a stuff amount compliant with a frequency deviation specification, selecting a threshold value corresponding to the type of an optical signal input to the optical interface 100A based on the operation information, and determining abnormality of a client-side clock frequency when the value indicated by the stuff information $INF_{STF}$ is larger than the selected threshold value. The arithmetic processor 163 which performs the operation as described above can be configured, for example, using an FPGA (field programmable gate array), etc.

Data signals passed through the respective AIS generating circuits 133 are multiplexed according to timing of the output clock signal CLKw of the PLL 162 and converted to a signal having a frame structure of OTU by a conversion circuit 137. The data signal contained in the OTU frame is transmitted to the WDM-side optical transceiver 150 as a WDM-side transmitting data signal TxDATw (second data signal). Together with WDM-side transmitting data signal TxDATw, a WDM-side transmitting clock signal TxCLKw, which was subjected to adjustment of timing with respect to a WDM-side transmitting data signal TxDATw by use of an output clock signal CLKw supplied from the PLL 162 to a buffer circuit (BUFF) 138, is transmitted to the optical transceiver 150.

In the following, the details of processing in the aforementioned conversion circuit 137 will be described more specifically referring to a specific example.

Figure 4:
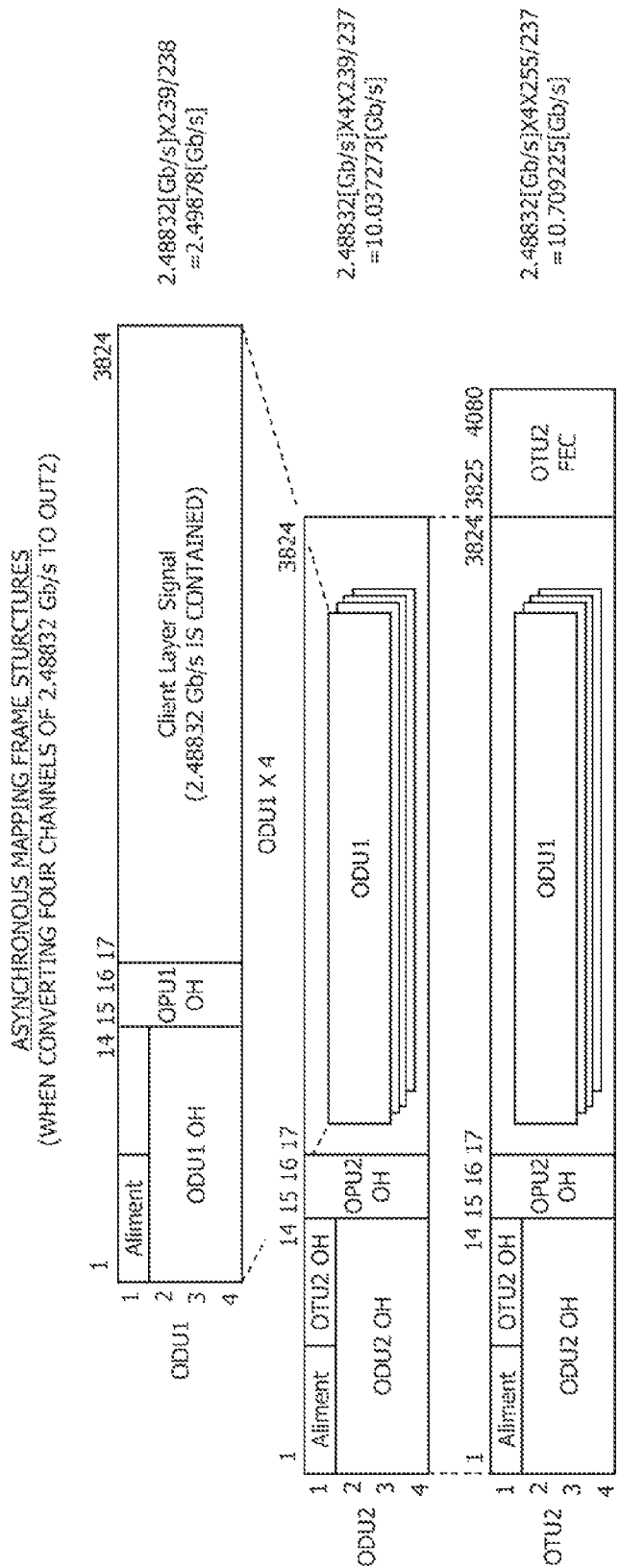
FIG. 4 illustrates a frame structure when a 4-channel 2.48832 Gb/s client-side data signal is converted to an OTU2.

FIG. 4 illustrates a frame structure when a 4-channel 2.48832 Gb/s client-side data signal is converted to an OTU2 (optical channel transport unit 2). In this case, a client-side data signal on each channel is contained into a payload region of each frame corresponding to an ODU1 (optical channel data unit 1) illustrated at an upper part of FIG. 4. When an overhead (OH) is added to a client-side data signal of 2.48832 Gb/s, the bit rate of the data signal framed into the ODU1 is 2.48832 [Gb/s]×239/238=2.49878 [Gb/s]. Then, as illustrated at a middle part of FIG. 4, the ODU 1 frames for four channels are multiplexed and contained into a payload region of a frame corresponding to an ODU2. Furthermore, as illustrated at a lower part of FIG. 4, this is converted to a data signal corresponding to an OTU2 by adding FEC (forward error correction) byte to the ODU2 frame. Since four channels are multiplexed and an OH and FEC are added, the bit rate of the data signal framed into an OTU2 increases to 2.48832 Gb/s×4×255/237=10.709225 Gb/s.

Figure 5:
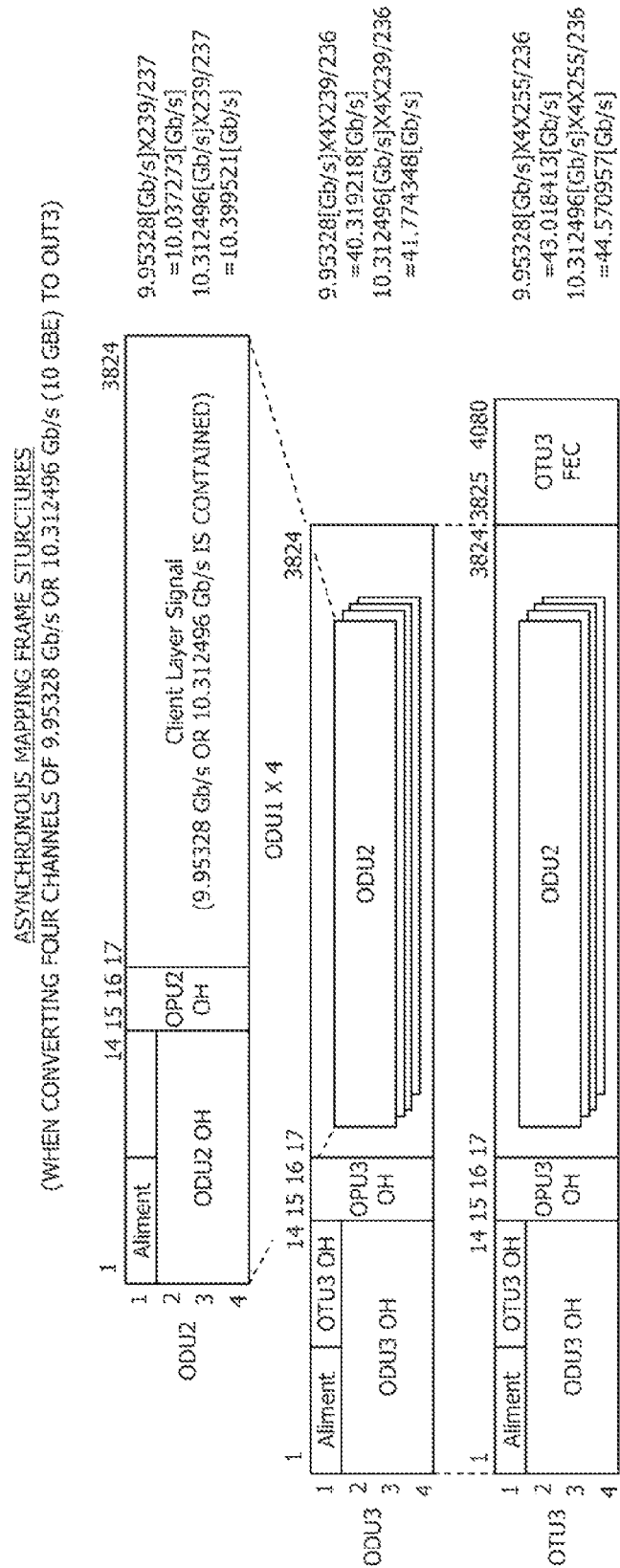
FIG. 5 illustrates a frame structure when a 4-channel 9.95328 Gb/s or 10 GbE client-side signal is converted to an OTU3.

FIG. 5 illustrates a frame structure when four channels of a client-side signal 9.95328 Gb/s or 10 GbE are converted to an OTU3. In this case, a client-side data signal on each channel is contained into a payload region of each frame corresponding to an ODU2 (optical channel data unit 2) illustrated at an upper part of FIG. 5. For example, when an OH is added to a client-side data signal of 10 GbE, the bit rate of the data signal framed into the ODU1 is 10.312496 Gb/s×239/237=10.399521 Gb/s. Then, as illustrated at a middle part of FIG. 5, the ODU2 frames for four channels are multiplexed and contained into a payload region of a frame corresponding to an ODU3. Furthermore, as illustrated at a lower part of FIG. 5, this is converted to a data signal corresponding to an OTU3 by adding FEC byte to the ODU3 frame. Since four channels of 10 GbE are multiplexed and an OH and FEC are added, the bit rate of the data signal framed into an OTU3 increases to 10.312496 Gb/s×4×255/236=44.570957 Gb/s.

Returning to FIG. 3, the optical transceiver 150 includes an optical transmitter (TX) 151 to which a WDM-side transmitting data signal TxDATw and a WDM-side transmitting clock signal TxCLKw are input from the digital wrapper 130, and an optical receiver (RX) 152 to which an optical signal demultiplexed by the optical wavelength multiplexing-demultiplexing device 30 (FIG. 2) is input. The optical transmitter 151 modulates light in the WDM wavelength band according to the WDM-side transmitting data signal TxDATw and the WDM-side transmitting clock signal TxCLKw, and outputs the optical signal so obtained (second optical signal) to the optical wavelength multiplexing-demultiplexing device 30. The optical receiver 152 receives a 1-wave optical signal (third optical signal) that is obtained by demultiplexing the WDM light passed through the WDM line 2 according to wavelength by the optical wavelength multiplexing-demultiplexing device 30, converts this optical signal to an electric signal, and perform recovery of the data and clock. In this recovery operation, an output clock signal CLKw from the PLL 162 may be used as a reference clock signal RefCLK. The data and clock, recovered by the optical receiver 152, are supplied to the digital wrapper 130 as a WDM-side received data signal RxDATw (third data signal) and as a WDM-side received clock signals RxCLKw (third clock signal).

In the digital wrapper 130, which receives the WDM-side received data signal RxDATw and the WDM-side received clock signal RxCLKw from the optical receiver 152, a reverse conversion circuit (D-DW) 141 subjects the WDM-side received data signal RxDATw to conversion that is reverse to the conversion performed by the above-described conversion circuit 137 according to timing of the WDM-side received clock signals RxCLKw, so that the reverse conversion circuit 141 generates data signals corresponding to four channels on the client side. At this time, the reverse conversion circuit 141 obtains a destuff information $INF_{DSTF}$ from an overhead area of each reversely conversed data signal, and outputs the each data signal and destuff information $INF_{DSTF}$ to a FIFO 142 corresponding thereto.

Each FIFO 142 writes each data signal from the reverse conversion circuit 141 according to timing of the WDM-side received clock signal RxCLKw. In addition, each FIFO 142 reads each contained data signal according to timing of the output clock signal CLKc1 to CLKc4 (fourth clock signal) from each PLL 172, and outputs the read data signal to an AIS forwarding circuit (AIS FWD) 143 corresponding thereto. At this time, each FIFO 142 performs a destuffing process in which, according to the destuff information $INF_{DSTF}$ obtained by the reverse conversion circuit 141, a stuff bit inserted in a predetermined region within the overhead area by the transmitting-side positive stuffing process is removed, or the extra data contained in a predetermined region within the overhead area by the transmitting-side negative stuff process is returned to its original position. Thus, the FIFO 142 has a function as a destuffing circuit.

Each PLL 172 mentioned above is constituted by a set of a selection circuit (SEL) 172A, a low-pass filter (LPF) 172B, and an oscillator (VCXO) 172C, which set corresponds to each client-side channel. To each selection circuit 172A, a WDM-side received clock signal RxCLKw that is output from the optical receiver 152 in the optical transceiver 150, and a standard clock signal OSC2 that is generated by a fixed oscillator 171 provided in the optical interface 100A are input, and the destuff information $INF_{DSTF}$ that is obtained by the reverse conversion circuit 141 and optical input off information which indicates that no optical signal is input from the WDM line 2 to an optical wavelength multiplexing-demultiplexing device 30 are supplied. When the optical input off information indicates that there is no optical input to the optical wavelength multiplexing-demultiplexing device 30, each selection circuit 172A selects the standard clock signal OSC2 from the fixed oscillator 171, or otherwise, it selects the WDM-side received clock signal RxCLKw. Then, each selection circuit 172A generates a phase error signal having a deviation corresponding to the destuff information $INF_{DSTF}$ based on the selected clock signal. The phase error signal generated by each selection circuit 172A is supplied to the oscillator 172C via the low-pass filter 172B, and each oscillator 172C outputs a clock signal CLKc1 to CLKc4 corresponding to each client-side channel.

Each AIS forwarding circuit 143 monitors the overhead of the data signal from the FIFO 142 according to timing of the output clock signal CLKc1 to CLKc4 from the PLL 172 associated therewith, identifies the AIS that was inserted at the transmitting side, and forwards this AIS to the client side at the same time when an abnormal clock frequency is detected. On the other hand, if the aforementioned PLL 172 selects a standard clock signal OSC2 when there is no optical input, and generates an output clock signal CLKc1 to CLKc4, each AIS forwarding circuit 143 generates an AIS which indicates that there is no optical input from the WDM line 2, and transmits the AIS to the client side.

The data signal passed through each AIS forwarding circuit 143 is transmitted as a client-side transmitting data signal TxDATc1 to TxDATc4 (fourth data signal) to the optical transmitter 112 of the optical transceiver 110 associated therewith. Together with the client-side transmitting data signal TxDATc1 to TxDATc4 (fourth data signal), a client-side transmitting clock signal TxCLKc1 to TxCLKc4, which was subjected to adjustment of timing with respect to the client-side transmitting data signal TxDATc1 to TxDATc4 by use of an output clock signal CLKc1 to CLKc4 supplied from the PLL 172 to a buffer circuit (BUFF) 144, is also transmitted to the optical transmitter 112 or each optical transceiver 110. Each optical transmitter 112 modulates light within a desired wavelength band according to a client-side transmitting data signal and a client-side transmitting clock signal supplied thereto, and transmits the optical signal (fourth optical signal) to the client line 4.

In the optical interface 100A that is configured as described above, the arithmetic processor 163 (also referred to as a determination circuit 163) determines whether an abnormal state, in which a frequency of each client-side received clock signal RxCLKc1 to RxCLKc4 is nonconforming, occurs, based on the stuff information $INF_{STF}$ that is generated by the frequency difference detection circuit 136, that is, based on the stuff amount in the stuffing process that is subjected to the client-side received data signal RxDATc1 to RxDATc4 corresponding to each channel CH1 to CH4. Then, when the arithmetic processor 163 determines that a specific clock frequency is abnormal, an AIS that indicates this abnormal frequency is generated and transmitted to the WDM side with the AIS being inserted in an overhead area of the data signal corresponding thereto. This AIS information is forwarded to the client side through the WDM line 2 so as to be transferred to the client device 3 (FIG. 1) which receives this optical signal at a terminal end of the WDM line. On the other hand, in a state in which the optical wavelength multiplexing-demultiplexing device 30 receives no optical signal from the receiving end of the WDM line 2, an AIS that indicates that there is no optical input is generated in the receiving optical interface 100A, and transferred to the client device 3 at a terminal end of the line. It allows a client device 3 disposed at a terminal end of the line to locate a site where an abnormal clock frequency occurs and a site where a no-optical-input state occurs, based on the AIS information contained in the overhead area of the received data signal, when an error is detected by the client device 3 at a terminal end of the line.

Hereinafter, an optical interface according to a second embodiment will be described.

Figure 6:
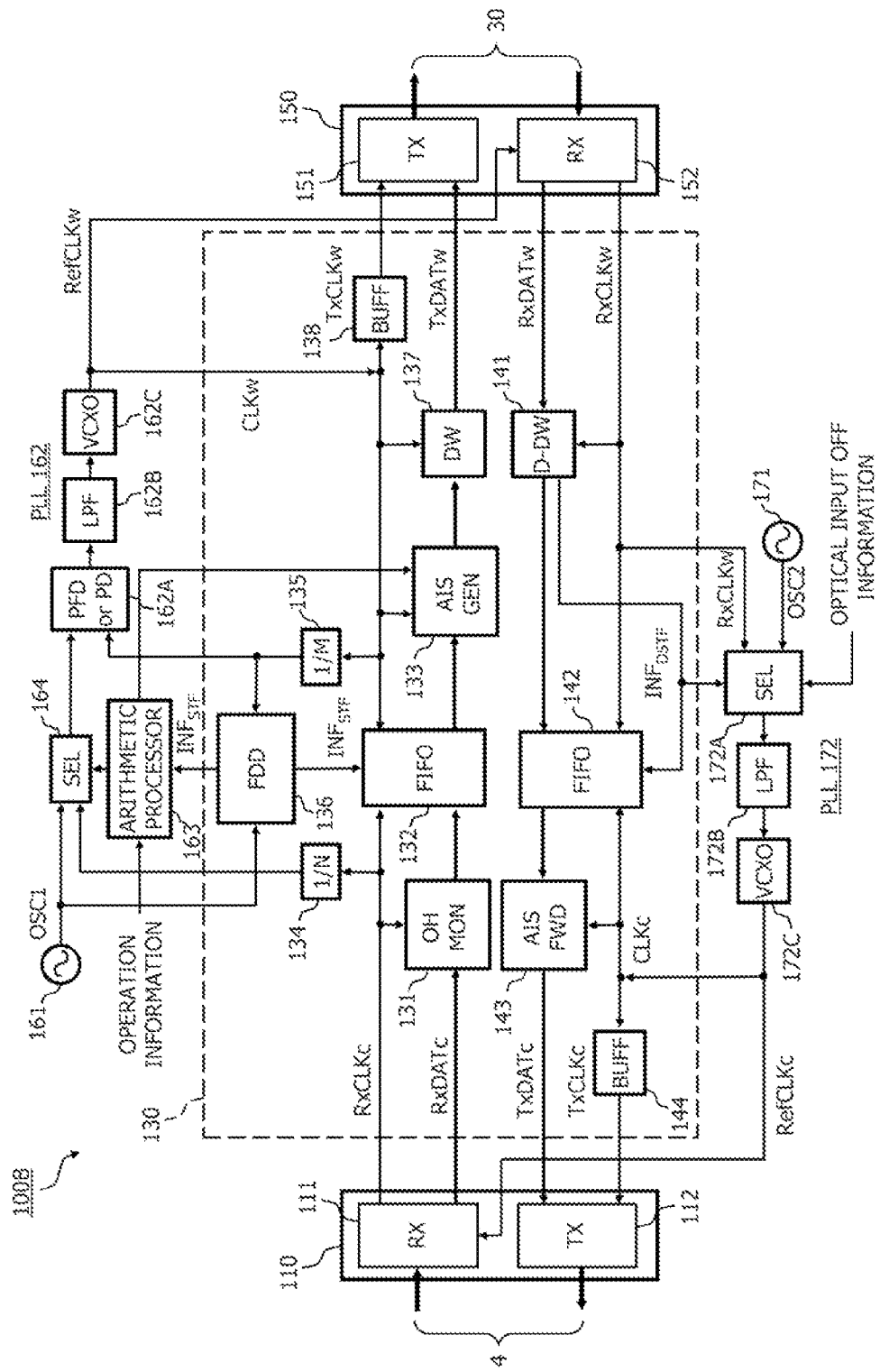
FIG. 6 is a block diagram illustrating a configuration of an optical interface according to a second embodiment.

FIG. 6 is a diagram illustrating a configuration of an optical interface according to the second embodiment. This optical interface, indicated by reference numeral 100B, is equivalent to the optical interface 10B within the optical interface device 10 that is a component of the WDM optical transmission device 1 illustrated in FIG. 2 described above. The aforementioned optical interface 100B converts a 1-channel optical signal, which is received from the client line 4, to an optical signal suitable for transmission on the WDM line 2, and performs reverse conversion thereof. In the following, the same reference numerals are used for the parts and components which are identical or similar to those of the first embodiment above, and further description thereof is not given. A WDM optical transmission system, which uses a WDM optical transmission device 1 including the optical interface 100B, may have a system configuration similar to that illustrated in FIG. 1 described above.

The configuration of the optical interface 100B is different from the configuration of the optical interface 100A described above in that an optical signal that is input to and output from a client line 4 is changed from a 4-channel signal (the interface 100A) to a 1-channel signal (the interface 100B), so that, in the optical interface 100B, the number of each following component provided therein is one: a optical transceiver 110, an OH monitoring circuit 131 in a digital wrapper 130, a FIFO 132, a FIFO 142, an AIS generating circuit (AIS GEN) 133, an AIS forwarding circuit (AIS FWD) 143, a buffer circuit (BUFF) 144, and a PLL 172. Furthermore, in the optical interface 100B, a selection circuit (SEL) 164 is additionally provided between a fixed oscillator 161 and a phase frequency detector 162A of a PLL 162.

To the selection circuit 164, a standard clock signal OSC1 that is generated by the fixed oscillator 161, and a signal that is produced by extracting a part of a client-side received clock signal RxCLKc supplied to the FIFO 132 and frequency demultiplexing the extracted signal by the 1/N frequency demultiplxing circuit 134, are input. If a clock frequency of an optical signal from a client side is not abnormal, the selection circuit 164 selects a client-side received clock signal RxCLKc passed through the 1/N frequency demultiplexing circuit 134 and outputs it to the phase frequency detector 162A, according to an output signal from an arithmetic processor 163 which is similar to that of the above-described first embodiment. On the other hand, if a clock frequency of an optical signal from a client side is abnormal, the selection circuit 164 selects a standard clock signal OCS1 from a fixed oscillator and outputs it to the phase frequency detector 162A.

Furthermore, an output clock signal CLKw from the PLL 162 is fed back to the phase frequency detector 162A via a 1/M frequency demultiplxing circuit 135. The phase frequency detector 162A detects a phase error of the output clock signal CLKw from PLL 162 with respect to the selected clock signal from the selection circuit 164, and supplies a phase error signal indicating the comparison result to the oscillator (VCXO) 162C via the low-pass filter (LPF) 162B.

Furthermore, in the optical interface 100B, an output signal from the fixed oscillator 161 and an output signal from the 1/M frequency demultiplxing circuit 135 are input to a frequency difference detection circuit 136. The frequency difference detection circuit 136 detects a difference between a frequency of the standard clock signal OSC1 and a frequency of the output clock signal CLKw from the PLL 162. Then, the frequency difference detection circuit 136 generates information regarding a stuff amount $INF_{STF}$ according to the detected clock frequency difference, and transfers the stuff information $INF_{STF}$ to the arithmetic processor 163.

In the optical interface 100B having such a configuration as described above, a 1-channel optical signal that is input from the client line 4 is received by an optical receiver 111 of an optical transceiver 110, and a client-side received data signal RxDATc and a client-side received clock signal RxCLKc which are recovered from this optical signal are supplied to the digital wrapper 130. In the digital wrapper 130, after the overhead information of the client-side received data signal RxDATc is monitored by an OH monitoring circuit 131, the client-side received data signal RxDATc is written into the FIFO 132 according to timing of the client-side received clock signal RxCLKc. At this time, a part of the client-side received clock signal RxCLKc to be input to the FIFO 132 is supplied to one input port of the selection circuit 164 via the 1/N frequency demultiplxing circuit 134. To the other input port of the selection circuit 164, the standard clock signal OSC1 from the fixed oscillator 161 is supplied.

In a normal mode, the selection circuit 164 selects the client-side received clock signal RxCLKc passed through the 1/N frequency demultiplxing circuit 134, and supplies the selected clock signal to the PLL 162. Thus, an output clock signal CLKw of the PLL 162 that is synchronous with the client-side received clock signal RxCLKc is generated. This output clock signal CLKw of the PLL 162 is fed back to the phase frequency detector 162A via the 1/M frequency demultiplxing circuit 135, and also supplied to the frequency difference detection circuit 136.

The frequency difference detection circuit 136 detects a difference between the frequency of a standard clock signal OSC1 from the fixed oscillator 161 and the frequency of an output clock signal CLKw of the PLL 162 passed through the 1/M frequency demultiplxing circuit 135. Then, the frequency difference detection circuit 136 generates information regarding a stuff amount $INF_{STF}$ according to the detected clock frequency difference, and transfers the stuff information $INF_{STF}$ to the arithmetic processor 163.

When the stuff information $INF_{STF}$ from the frequency difference detection circuit 136 indicates a value that exceeds a stuff amount which can occur within the specification limits of frequency deviation, the arithmetic processor 163 determines that the frequency of a client-side received clock signal RxCLKc is abnormal, and outputs a signal indicating the result to the selection circuit 164 and the AIS generating circuit 133, as in the above-described first embodiment. When the output signal from the arithmetic processor 163 indicating clock frequency abnormality is received, the selection circuit 164, which selects a client-side received clock signal RxCLKc in a normal mode, is switched to select a standard clock signal OSC1 that is output from the fixed oscillator 161, and to supply the standard clock signal OSC1 to the PLL 162 as a selected clock signal. Thus, when a client-side clock frequency is abnormal, an output clock signal CLKw of the PLL 162 that is synchronous with the standard clock signal OSC1 is generated.

The client-side received data signal RxDATc contained in the FIFO 132 is read out according to timing of the output clock signal CLKw of the PLL 162, and is output to the AIS generating circuit 133. At this time, a stuffing process, similar to that performed in the above-described first embodiment, is performed according to the stuff information $INF_{STF}$ from the frequency difference detection circuit 136. When the output signal from the arithmetic processor 163 indicates the presence of an abnormal clock frequency, the AIS generating circuit 133 generates an AIS, and inserts the generated AIS into a predetermined region in the overhead of the data signal that it output from the FIFO 132.

The data signal passed through the AIS generating circuit 133 is converted to a WDM transmitting data signal TxDATw having a frame structure corresponding to an OUT by a conversion circuit 137, and the WDM transmitting data signal TxDATw is transmitted to the WDM-side optical transceiver 150 together with a WDM-side transmitting clock signal TxCLKw that is obtained by subjecting an output clock signal CLKw from the PLL 162 to adjustment of timing by a buffer 138. In the optical transceiver 150, an optical transmitter 151 modulates light in the WDM wavelength range according to the WDM-side transmitting data signal TxDATw and the WDM-side transmitting clock signal TxCLKw, and the optical signal so obtained is output to an optical wavelength multiplexing-demultiplexing device 30.

In the following, the details of processing in the aforementioned conversion circuit 137 will be described more specifically referring to a specific example, as in the description for the first embodiment above.

Figure 7:
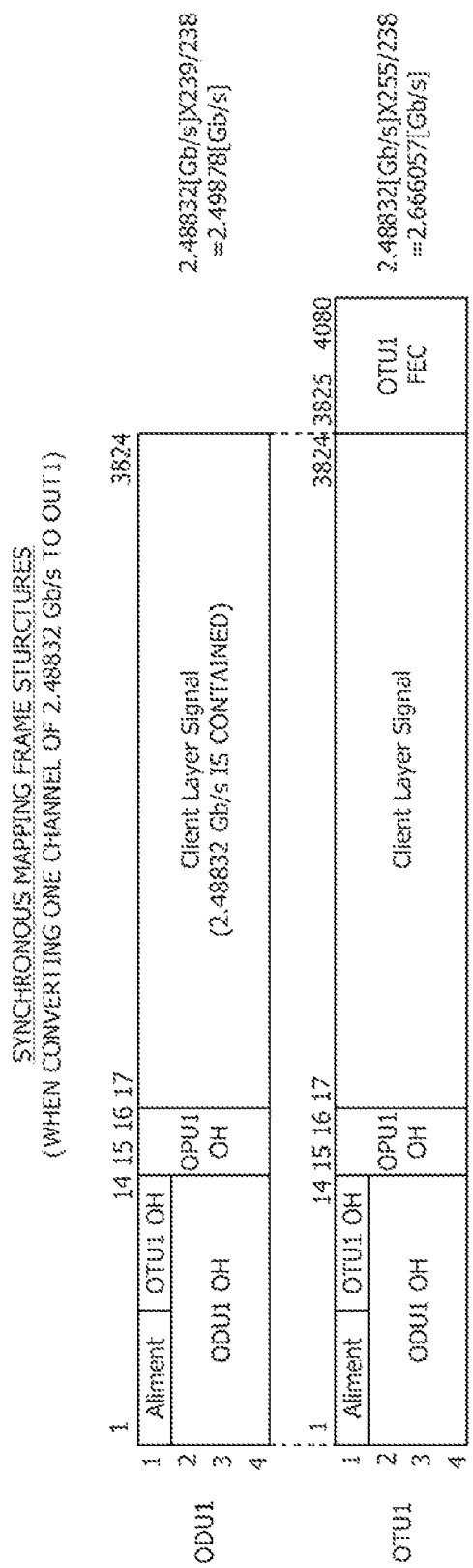
FIG. 7 illustrates a frame structure when a 1-channel 2.48832 Gb/s client side data signal is converted to an OTU1.

FIG. 7 illustrates a frame structure when one channel of a 2.48832 Gb/s client side data signal is converted to an OTU1. In this case, a 1-channel client-side data signal is contained into a payload region of each frame corresponding to an ODU1 illustrated at an upper part of FIG. 7. When an OH is added to a client-side data signal of 2.48832 Gb/s, the bit rate of the data signal framed into the ODU1 is 2.48832 [Gb/s]× 239/238=2.49878 [Gb/s]. Furthermore, as illustrated at a lower part of FIG. 4, this is converted to a data signal corresponding to an OTU1 by adding FEC byte to the ODU1 frame. The bit rate of the data signal framed into an OTU1 increases to 2.48832 [Gb/s]×255/238=2.666057 [Gb/s].

FIG. 8 illustrates a frame structure when 1-channel client-side signal of 9.95328 Gb/s or 10.312496 Gb/s (10 GbE) is converted to an OTU2. In this case, the 1-channel client-side data signal is contained into a payload region of a frame corresponding to an ODU2 illustrated at an upper part of FIG. 8. For example, when an OH is added to a client-side data signal of 10 GbE, the bit rate of the data signal framed into the ODU2 is 10.312496 [Gb/s]×239/237=10.399521 [Gb/s]. Furthermore, as illustrated at a lower part of FIG. 8, this is converted to a data signal corresponding to an OTU2 by adding FEC byte to the ODU2 frame. The bit rate of the data signal framed into an OTU2 increases to 10.312496 [Gb/s]× 255/237=11.095724 [Gb/s].

Figure 9:
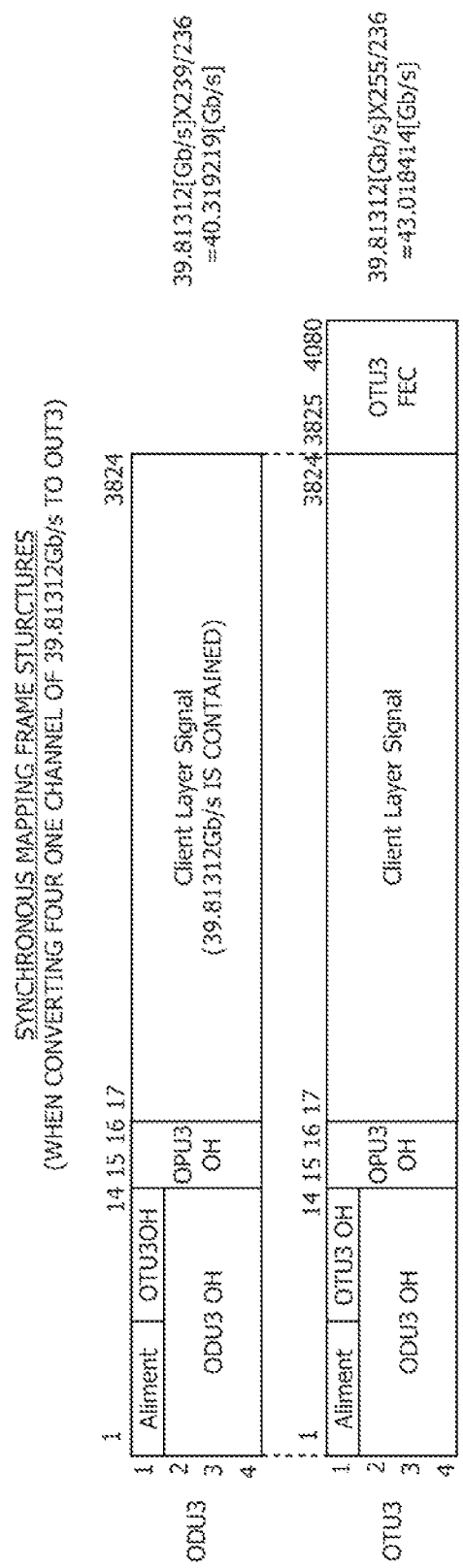
FIG. 9 illustrates a frame structure when a 1-channel 39.81312 Gb/s client side data signal is converted to an OTU3.

FIG. 9 illustrates a frame structure when a 1-channel client side data signal of 39.81312 Gb/s is converted to an OTU3. In this case, the 1-channel client-side data signal is contained into a payload region of each frame corresponding to an ODU3 illustrated at an upper part of FIG. 9. When an OH is added to a client-side data signal of 39.81312 Gb/s, the bit rate of the data signal framed in ODU3 is 39.81312 [Gb/s]×239/ 236=40.319219 [Gb/s]. Furthermore, as illustrated at a lower part of FIG. 9, the aforementioned signal is converted to a data signal having an OTU3 format by adding FEC byte to the ODU3 frame. The bit rate of the data signal framed into an OTU3 increases to 39.81312 [Gb/s]×255/236=43.018414 [Gb/s].

Returning to FIG. 6, the optical receiver 152 of the optical transceiver 150 receives a 1-wave optical signal that is obtained by demultiplexing the WDM light passed through the WDM line 2 according to wavelength by the optical wavelength multiplexing-demultiplexing device 30, and recovers the data and clock from the optical signal. In the recovering operation by the optical receiver 152, the clock signal CLKw, which was used when converting client-side optical signal on the opposite line, is used as a reference clock RefCLKw. When a client-side clock frequency is abnormal, the selection circuit 164 is switched to select a clock signal that is synchronous to a standard clock signal OSC1 from the fixed oscillator 161, in place of the reference clock signal RefCLKw, so that the situation that a clock frequency deviation exceeds the proof strength of the optical receiver 152 can be avoided. The data and clock, recovered by the optical receiver 152, are supplied to the digital wrapper 130 as a WDM-side received data signal RxDATw and as a WDM-side received clock signals RxCLKw.

In the digital wrapper 130, a reverse conversion circuit (D-DW) 141 subjects the WDM-side received data signal RxDATw to reverse conversion, so that a data signal that is compatible with a client-side 1-channel format is generated, the destuff information $INF_{DSTF}$ is obtained from the overhead of this data signal, and this data signal and the destuff information $INF_{DSTF}$ are output to a FIFO 142. The FIFO 142 writes the data signal from the reverse conversion circuit 141 according to timing of the WDM-side received clock signal RxCLKw, and reads out a contained data signal according timing of the output clock signal CLKc from the PLL 172, and output the read data signal to an AIS forwarding circuit (AIS FWD) 143. At this time, a destuffing process is applied to a data signal according to the destuff information $INF_{DSTF}$ that is obtained by the reverse conversion circuit 141.

When the optical input off information indicates a state in which there is no optical input to the optical wavelength multiplexing-demultiplexing device 30, the selection circuit 172A selects the standard clock signal OSC2 from the fixed oscillator 171, or otherwise, it selects the WDM-side received clock signal RxCLKw. Then, the selection circuit 172A generates a phase error signal having a deviation corresponding to the destuff information $INF_{DSTF}$ based on the selected clock signal, and the phase error signal is supplied to the oscillator 172C via a low-pass filter 172B. Thus, a clock signal CLKc that is available on the client side is output from the oscillator 172C.

The AIS forwarding circuit 143 monitors the overhead of the data signal from the FIFO 142 according to timing of the output clock signal CLKc from the PLL 172, identifies the AIS inserted at the transmitting side, and forwards this AIS to the client side. On the other hand, if the PLL 172 selects a reference clock signal OSC2 when there is no optical input, and generates an output clock signal CLKc, the AIS forwarding circuit 143 generates an AIS which indicates that there is no optical input from the WDM line 2, and transmits the AIS to the client side.

The data signal passed through the AIS forwarding circuit 143 is transmitted to the optical transmitter 112 of the optical transceiver as a client-side transmitting data signal TxDATc. Together with client-side transmitting data signal TxDATc, a client-side transmitting clock signal TxCLKw, which was subjected to adjustment of timing with respect to a client-side transmitting data signal TxDATc by use of an output clock signal CLKc supplied from the PLL 172 to a buffer circuit BUFF 144, is transmitted to the optical transmitter 112. An optical transmitter 151 modulates light within a desired wavelength band according to a client-side transmitting data signal TxDATc and a client side transmitting clock signal TxCLKc, and transmits the resultant optical signal to the client line 4.

According to the optical interface 100B as described above, as in the above-described first embodiment, the arithmetic processor 163 determines an abnormal frequency of a client-side received clock signal RxCLKc, and transfers an AIS, which indicates the abnormal frequency and is packed in the overhead of a data signal, to a client device 3 at a terminal end of the line based on the stuff information $INF_{STF}$ generated by the frequency difference detection circuit 136. On the other hand, in a state in which the optical wavelength multiplexing-demultiplexing device 30 receives no optical signal from the receiving end of the WDM line 2, an AIS that indicates that there is no optical input is generated in the receiving optical interface 100B, and transferred to the client device 3 at a terminal end of the line. It allows a client device 3 disposed at a terminal end of the line to locate a site where an abnormal clock frequency occurs and a site where a no-optical-input state occurs, based on the AIS information contained in the overhead area of the received data signal, when an error is detected by the client device 3 at a terminal end of the line. Furthermore, when a clock signal CLKw that was used for processing a client-side optical signal is also used as a reference clock signal RefCLKw by the optical receiver 152 on the opposite line in the same optical interface 100B, if a deviation of a client-side clock frequency increases, the selection circuit 164 is changed so that a reference lock signal RefCLKw that is synchronous with a reference clock signal OSC1 is used by the optical receiver 152, whereby occurrence of error on the opposite line can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical interface device for converting a first optical signal that is received from a first optical transmission line to a second optical signal that can be transmitted through a second optical transmission line which is different from the first optical transmission line, the optical interface device comprising:
    an optical receiver configured to receive the first optical signal, and configured to recover a first data signal and a first clock signal corresponding to the first optical signal;
    a clock generator configured to generate a second clock signal corresponding to the second optical signal;
    a frequency difference detector configured to detect a frequency difference between the first clock signal and the second clock signal, and configured to generate information regarding a stuff amount for a stuffing process to be applied to the first data signal for compensating for the difference;
    a stuffing circuit configured to subject the first data signal to a stuffing process based on the information generated by the frequency difference detector according to timing of the second clock signal;
    a determination circuit configured to determine whether a frequency deviation of the first clock signal is abnormal based on the information generated by the frequency difference detector;
    an alarm generator configured to receive a data signal from the stuffing circuit, and configured to generate an alarm indication signal indicating that the frequency deviation is abnormal to another component that is disposed downstream therefrom through the second optical transmission line when the determination circuit determines abnormal frequency deviation, to thereby insert the alarm indication signal in a predetermined region of the data signal;
    a converter configured to convert the data signal passed through the alarm generator to a second data signal having a frame structure that is compatible with the second optical signal; and
    an optical transmitter configured to modulate light according to the second data signal, to thereby generate the second optical signal.

2. The optical interface device according to claim 1, wherein
    the optical receiver is configured to receive the first optical signal carried on each of two or more channels which are asynchronously input from the first optical transmission line;
    the number of each of the frequency difference detectors, the stuffing circuits, and the alarm generators is equal to the number of the channels; and the converter is configured to multiplex respective data signals respectively passed through the two or more alarm generators to the second data signal.

3. The optical interface device according to claim 1, wherein the clock generator comprises:
a fixed oscillator adapted to generate a standard clock signal corresponding to the second optical signal; and
a phase lock loop adapted to output the second clock signal that is synchronous with a standard clock signal from the fixed oscillator.

4. The optical interface device according to claim 1, wherein
the optical receiver is configured to receive the first optical signal carried on one channel that is input from the first optical transmission line; and
the converter is configured to convert a data signal passed through the alarm generator to the second data signal by adding an overhead and an error correction byte, which are indispensable for the second optical signal, to the data signal.

5. The optical interface device according to claim 4, wherein the clock generator comprises:
a fixed oscillator adapted to generate a standard clock signal corresponding to the second optical signal;
a selection circuit adapted to receive the standard clock signal that is output from the fixed oscillator and the first clock signal that is generated by the optical receiver, and adapted to select the first clock signal when the determination circuit determines that frequency deviation is normal and select the standard clock signal when the determination circuit determines that frequency deviation is abnormal, to thereby output the selected clock signal; and
a phase lock loop adapted to output the second clock signal that is synchronous with the selected clock signal from the selection circuit; and
wherein the frequency difference detector is configured to detect a difference between the frequency of the standard clock signal from the fixed oscillator and the frequency of the second clock signal from the phase lock loop.

6. The optical interface device according to claim 1, wherein
the determination circuit is configured to determine that a frequency deviation of the first clock signal is abnormal if the information generated by the frequency difference detector indicates a value that exceeds a stuff amount which can occur within specification limits of frequency deviation corresponding to a type of the first optical signal, and determine that a frequency deviation of the first clock signal is normal if the information indicates a value not exceeding the stuff amount.

7. The optical interface device according to claim 1, further comprising:
an opposite-side optical receiver configured to receive a third optical signal that is transmitted through the second optical transmission path in a direction opposite to a direction in which the second optical signal generated in the optical transmitter is transmitted, and configured to recover a third data signal and a third clock signal corresponding to the third optical signal;
a reverse converter configured to subject the third data signal to conversion that is reverse to conversion performed by the converter, and configured to obtain information regarding a destuff amount contained in the reversely converted data signal;
an opposite-side clock generator configured to generate a fourth clock signal corresponding to a fourth optical signal that can be transmitted through the first optical transmission line and transmitted in a direction opposite to a direction in which the first optical signal is transmitted,
a destuffing circuit configured to subject the data signal from the reverse converter to a destuffing process based on the information obtained by the reverse converter, according to the fourth clock signal, to thereby generate a fourth data signal corresponding to the fourth optical signal;
an alarm forwarding circuit configured to identify the alarm indicating signal contained in the fourth data signal, to thereby forward the alarm indicating signal; and
an opposite-side optical transmitter configured to modulate light according to the fourth signal passed through the alarm forwarding circuit, to thereby generate the fourth optical signal.

8. The optical interface device according to claim 7, wherein
the opposite-side optical receiver is configured to recover the third data signal and the third clock signal using the second clock signal as a reference clock signal.

9. The optical interface device according to claim 7, wherein the opposite-side clock generator comprises:
a fixed oscillator adapted to generate a standard clock signal corresponding to the fourth optical signal; and
a phase synchronizing circuit adapted to receive the standard clock signal from the fixed oscillator and a third clock signal generated by the opposite-side optical receiver, and adapted to select the third clock signal when the third optical signal is input to the opposite-side optical receiver, whereas select the standard clock signal when the third optical signal is not input to the opposite-side optical receiver, and adapted to generate the fourth clock signal using a phase error signal having deviation corresponding to the information obtained by the reverse converter based on the selected clock signal.

10. The optical interface device according to claim 9, wherein
the alarm forwarding circuit is configured to generate an alarm indication signal for indicating a situation that no third signal is input to another component disposed downstream therefrom and connected through the first optical transmission line, to thereby insert the alarm indication signal in a predetermined region in the fourth data signal.

11. A wavelength division multiplexing (WDM) optical transmission system, in which WDM signal light is transmitted between opposite WDM optical transmission devices via WDM lines, and in which two or more client devices are connected to each WDM optical transmission device via client lines, wherein
each of the WDM optical transmission device comprises an optical interface device according to claim 1,
the WDM line is formed from the second optical transmission line, and
the client line is formed from the first optical transmission line.

12. A method for monitoring abnormal frequency deviation of a first optical signal in an optical interface device, the optical interface device converting a first optical signal that is received from a first optical transmission line to a second optical signal that can be transmitted through a second optical transmission line which is different from the first optical transmission line, the method comprising:

receiving the first optical signal, and recovering a first data signal and a first clock signal corresponding to the first optical signal;

generating a second clock signal corresponding to the second optical signal;

detecting difference between the first clock signal and the second clock signal;

generating information regarding a stuff amount in a stuffing process that is subjected to the first data signal for compensating for the detected frequency difference;

subjecting the first data signal to a stuffing process based on the information regarding the stuff amount according to timing of the second clock signal;

determine whether frequency deviation of the first clock signal is abnormal based on the information regarding the stuff amount;

generating an alarm indication signal indicating that the frequency deviation is abnormal to another component that is connected downstream therefrom through the second optical transmission line when the frequency deviation is determined to be abnormal;

inserting the alarm indication signal to a predetermined region in a data signal subjected to the stuff process;

converting the data signal into which the alarm indication signal is inserted to a second data signal having a frame structure that is compatible with the second optical signal; and modulating light according to the second data signal, to thereby generate the second light signal.

* * * * *